United States Patent [19]

Fujii et al.

[11] Patent Number: 4,615,000
[45] Date of Patent: Sep. 30, 1986

[54] PULSE WIDTH MODULATION INVERTER SYSTEM

[75] Inventors: Hiroshi Fujii; Hideyuki Shimonabe, both of Chiba, Japan

[73] Assignee: Hitachi, Ltd., Tokyo, Japan

[21] Appl. No.: 692,573

[22] Filed: Jan. 18, 1985

[30] Foreign Application Priority Data

Jan. 20, 1984 [JP] Japan ................................. 59-7184

[51] Int. Cl.$^4$ ............................................. H02M 1/12
[52] U.S. Cl. ........................................ 363/41; 363/98; 318/811
[58] Field of Search ................ 363/37, 41, 97, 98, 363/131, 132; 318/799–802, 808, 810, 811

[56] References Cited

U.S. PATENT DOCUMENTS

| | | | |
|---|---|---|---|
| 3,611,086 | 10/1971 | Mokrytzki et al. | 363/41 X |
| 3,662,247 | 5/1972 | Schieman | 363/41 |
| 3,971,972 | 7/1976 | Stich | 363/41 X |
| 4,480,299 | 10/1984 | Muto et al. | 318/802 X |

*Primary Examiner*—Peter S. Wong
*Attorney, Agent, or Firm*—Antonelli, Terry & Wands

[57] ABSTRACT

A PWM inverter system for converting DC power to AC power comprises an output voltage setting circuit for generating a pattern of output voltage value corresponding to a speed command value, an oscillator for generating a pulse train having a frequency proportional to the speed command value, a frequency division circuit for dividing the frequency of the pulse train produced by the oscillator to produce interrupt pulses, a pulse interval measuring circuit for measuring a pulse interval between predetermined ones of the interrupt pulses supplied from the frequency division circuit, an arithmetic unit responding to the input of the interrupt pulses from the frequency division circuit to produce a timing signal corresponding to the timing at which said interrupt pulse is inputted and update data associated with current operating phase relative to a fundamental wave, to thereby produce pulse width data corresponding to the result of multiplication of a value associated with the output voltage value supplied from the output voltage setting circuit, a value associated with the pulse interval supplied from the pulse interval measuring circuit and a value associated with the operating phase relative to said fundamental wave, a pulse width conversion circuit supplied with the pulse width data from the arithmetic unit for producing a width pulse train conforming to the pulse width data at every timing signal supplied from the arithmetic unit, and a waveform processing circuit supplied with the width pulse train from the pulse width conversion circuit and the timing signal from the arithmetic unit to produce sequentially phase output pulse trains.

19 Claims, 3 Drawing Figures

PULSE WIDTH MODULATION INVERTER SYSTEM

The present invention relates generally to a pulse width modulation (PWM) inverter system for converting a direct current (DC) power to an alternating current (AC) power. More particularly, the invention concerns an improvement of the pulse width modulation or PWM circuit.

The PWM DC-AC inverter is composed of a sinusoidal wave generating circuit for generating a sinusoidal wave corresponding to a fundamental wave of the output AC power and a triangular wave generating circuit for generating a triangular carrier, wherein the output waveform of both circuits are synthesized to prepare a string or row of pulses which constitutes a basic signal for a gate or base signal applied to switching elements constituting a major part of the inverter. However, in the inverter of the fixed circuit congiguration mentioned above, a complicated peripheral circuit is required when the frequency of the fundamental wave or the carrier is to be altered, providing an obstacle to the inexpensive realization of the inverter system of a small size.

On the other hand, the capability of altering the frequency of the fundamental wave or carrier is an important factor not only for broadenig the control range of loads powered by the inverter but alos for avoiding mechanical and/or electrical vibrations. Additionally, it is desirable to increase the number of the output pulses relative to the fundamental wave in a low-frequency range of the inverter output power for the purpose of improving the waveform thereof, while decreasing the output pulse number or frequency in a high-frequency range of the inverter output to thereby improving the switching efficiency of the switching elements.

Under the circumstances, there is a tendency of replacing the conventional analogue control circuit by a digital control circuit, as is proposed in Japanese Patent Application Laid-Open Nos. 157275/1981 and 43573/1981, by way of example. However, the PCM systems proposed heretofore suffer shortcomings in that an expensive memory circuit of a large storage capacity is required for storing the switching pattern of the switching elements as a function of the output frequency, complicated arithmetic operation is required for deriving the gate (base) signal for the switching elements and so on, presenting thus difficulty in implementing inexpensively the inverter system of an improved controllability.

Accordingly, it is an object of the present invention to provide a pulse width modulation or PWM inverter system of an improved controllability.

In view of the above and other objects which will be more apparent from the following description, there is provided according to a general aspect of the present invention a PCM inverter system for converting DC power to AC power, which system includes a pulse width modulation or PCM circuit designed to produce phase pulse output of a pulse width which corresponds to a product of a value associated with the inverter output voltage, a value associated with a time interval at which the phase output pulses are produced and a value associated with an instantaneous value of a fundamental wave at a phase corresponding to that of the phase output pulse.

More specifically, the PWM inverter system according to the invention includes a pulse width modulating circuit which is so arranged as to produce phase output pulses each having a width corresponding to the result of multiplication of a value associated with the inverter output voltage value corresponding to the inverter output frequency, a value associated with the interval at which phase output pulses corresponding to the carrier of the conventional inverter make appearance, and a value associated with the instantaneous value of the fundamental wave at the phase position of the phase output pulses corresponding to the fundamental wave employed in the conventional inverter.

According to an aspect of the invention there is provided a PWM inverter system for converting DC power to AC power, comprising an output voltage setting circuit for generating a pattern of output voltage value corresponding to a speed command value, an oscillator for generating a pulse train having a frequency proportional to the speed command value, a frequency division circuit for dividing the frequency of the pulse train produced by the oscillator to produce interrupt pulses, a pulse interval measuring circuit for measuring a pulse interval between predetermined ones of the interrupt pulses supplied for the frequency division circuit, an arithmetic unit responding to the input of the interrupt pulses from the frequency division circuit to produce a timing signal corresponding to the timing at which said interrupt pulse is inputted an update data associated with current operating phase relative to a fundamental wave, to thereby produce pulse width data corresponding to the result of multiplication of a value associated with the output voltage value supplies from the output voltage setting circuit, a value associated with the pulse interval supplied from the pulse interval measuring circuit and a value associated with the operating phase relative to said fundamental wave, a pulse width conversion circuit supplied with the pulse width data from the arithmetic unit for producing a width pulse train conforming to the pulse width data at every timing signal supplied from the arithmetic unit, and a waveform processing circuit supplied with the width pulse train from the pulse width conversion circuit and the timing signal from the arithmetic unit to produce sequentially phase output.pulse trains.

The present invention will be apparent from the following detailed description taken in conjunction with the accompanying drawings, in which.

As the result of a series of studies and analyses of various inverter control circuits or systems, the inventors have found that various processing operations required for the inverter control can be reduced or mitigated by processing a string or train of pulse signals for controlling the switching elements of the inverter in accordance with the following expression:

$$T_p = K \cdot T_c \cdot V \cdot \sin \omega t \qquad (1)$$

where $T_p$ represents the pulse width of the individual pulses constituting the phase output pulse train which provides the basis for the inverter control, K represents a proportional constant, Tc represents a time interval at which the pulses are produced, V represents the output voltage of the inverter, and ωt represents the phase of the pulse signal relative to the fundamental wave.

Figure 1:
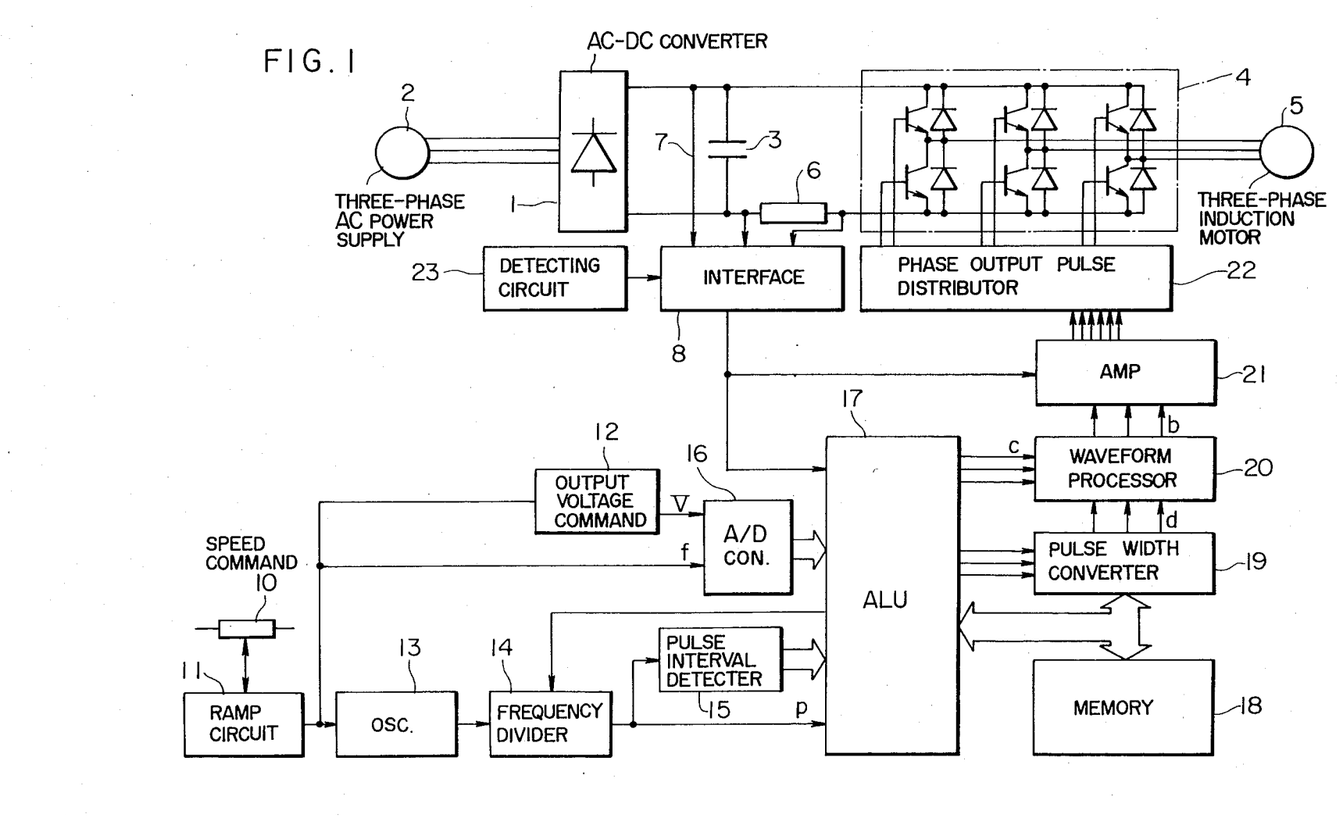
FIG. 1 is a block diagram showing a general arrangement of a PWM DC-AC inverter system according to an exemplary embodiment of the present invention.

In the following, an inverter system which is so implemented as to satisfy the condition given by the expression (1) will be described by referring to FIG. 1 which shows in a block diagram an arrangement of the inverter system embodying the invention. In FIG. 1, a reference numeral 1 denotes a converter for converting an AC power supplied from a three-phase AC power supply 2 to a DC power, 3 denotes a smoothing capacitor inserted in a DC circuit connected to the output of the AC-DC converter 1, and 4 an inverter bridge circuit for converting again DC power to a three-phase AC power. In the illustrated system, the switching elements are constituted by transistors. The major circuits of the inverter system mentioned above are controlled by a control circuit which will be described in detail hereinafter. In FIG. 1, a reference numeral 5 denotes a three-phase induction motor connected to the output of the inverter system, 6 denotes a resistor inserted in the DC circuit for detecting an overcurrent, and 7 denotes a wire or line for detecting an overvoltage in the DC circuit, both the resistor 6 and the line 7 being connected to the control circuit through an interface circuit 8 for supplying respective detection signals to the control circuit.

Now, description will be made in detail on the arrangement of the control circuit. In FIG. 1, a reference numeral 10 denotes a speed setting or command circuit for presetting the frequency of the output voltage of the inverter system and hence the operation or rotation speed of the three-phase induction motor 5. A numeral 11 denotes a ramp circuit for adjusting or regulating the time required for accelerating or decelerating the three-phase induction motor 5 to the speed level preset by the speed command circuit 10 in conformance with the load characteristic of a load connected to the output shaft of the induction motor 5. A numeral 12 denotes an output voltage command circuit which responds to the speed command signal supplied through the ramp circuit 11 to produce signals representative of the output voltage patterns or profiles of the inverter system corresponding to the desired controls of the induction motor operation such as constant torque control operation, constant output control operation or the like. A numeral 13 denotes an oscillator for producing a pulse train of a pulse frequency proportional to the speed command value. A numeral 14 denotes a frequency division circuit for dividing the frequency of the pulse train produced by the oscillator 13 to thereby produce a pulse train indicative of the time interval at which the phase output pulses constituting the fundamental wave are produced. In other words, the relationship between the speed command value and the oscillation frequency of the oscillator 13 as well as the division ratio of the frequency division circuit 14 are previously so selected that the pulse train conforming to the time interval at which the phase output pulses make appearance can be produced. A numeral 15 denotes a pulse interval measuring or detecting circuit for measuring the interval at which a particular or predetermined pulse makes appearance in the pulse train produced by the frequency division circuit 14, the result of measurement being outputted as a pulse interval data signal. A numeral 16 denotes an analogue-to-digital or A/D converter for converting the analogue data of the output voltage command V and the speed command f into corresponding digital data. A numeral 17 denotes an arithmetic and logical processing unit (referred to simply as arithmetic unit) for executing predetermined arithmetic operations on various input data in accordance with program, both of which are previously stored in a memory 18. More specifically, the memory 18 stores therein program data and various table data required for the arithmetic operation executed by the arithmetic unit 17 and contains work areas saved for the operations of the arithmetic unit 17. A numeral 19 denotes a pulse width conversion circuit (also referred to as timer circuit) constituted by a sort of timer which responds to the command signals supplied from the arithmetic unit 17 for producing a width pulse train containing width pulse signals each representing the pulse width corresponding to the pulse width data resulting from the operation of the arithmetic unit 17. A numeral 20 denotes a waveform processing circuit composed of D-type flip-flops as the basic components. The waveform processing circuit 20 receives the data signal from the arithmetic processing unit 17 and the width pulse signal from the pulse width conversion circuit 19 as the clock inputs for producing sequentially the phase output pulses. A numeral 21 denotes a phase output distribution circuit and a numeral 22 denotes a signal amplifier. The phase output distribution circuit 22 serves to distribute the phase output pulses among the upper and lower arms for each phase of the three-phase inverter bridge circuit 4, whereby the phase output pulses amplified through the signal amplifier 21 are supplied as the base or gate drive signals to the individual switching elements constituting the inverter bridge circuit 4. Finally, a reference numeral 23 denotes an abnormality detecting circuit for detecting possible abnormalities of the three-phase power supply network 2 such as momentary service interruption, undervoltage condition or the like, the result of the detection being transmitted to the arithmetic unit 17 by way of the interface 8. Further, upon detection of the overcurrent and/or overvoltage in the DC circuit, the momentary service interruption of the three-phase power supply network and the undervoltage condition, the interface circuit 8 produces an emergency breaking signal to the phase output distribution circuit 21, which in turn responds to these abnormality signals to stop the distribution of the phase output pulses among the switching elements for assuring the protection of the inverter bridge circuit.

Figure 2:
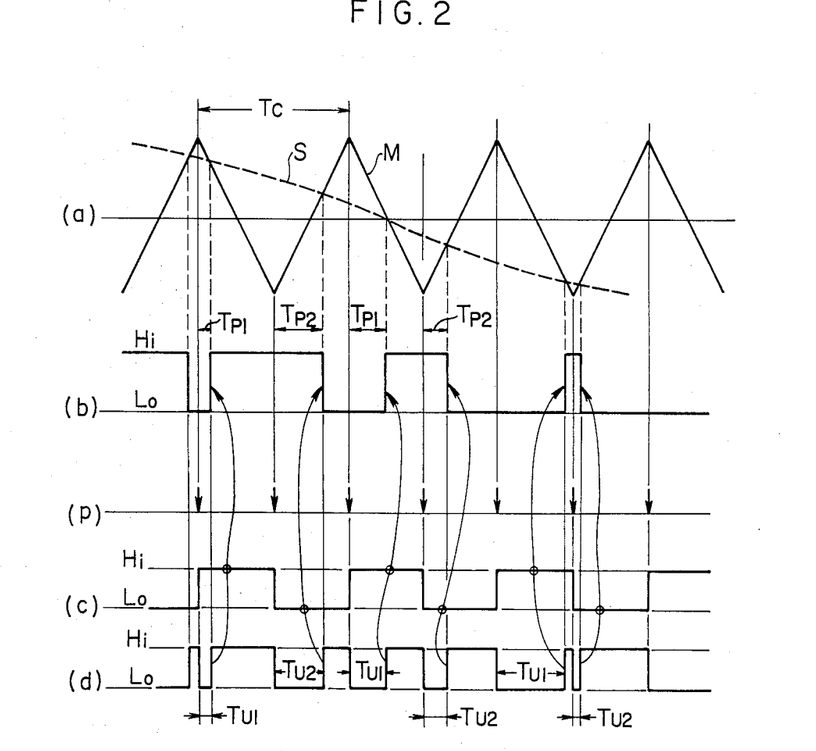
FIG. 2 is a timing chart for illustrating operation of the system shown in FIG. 1.
Figure 3:
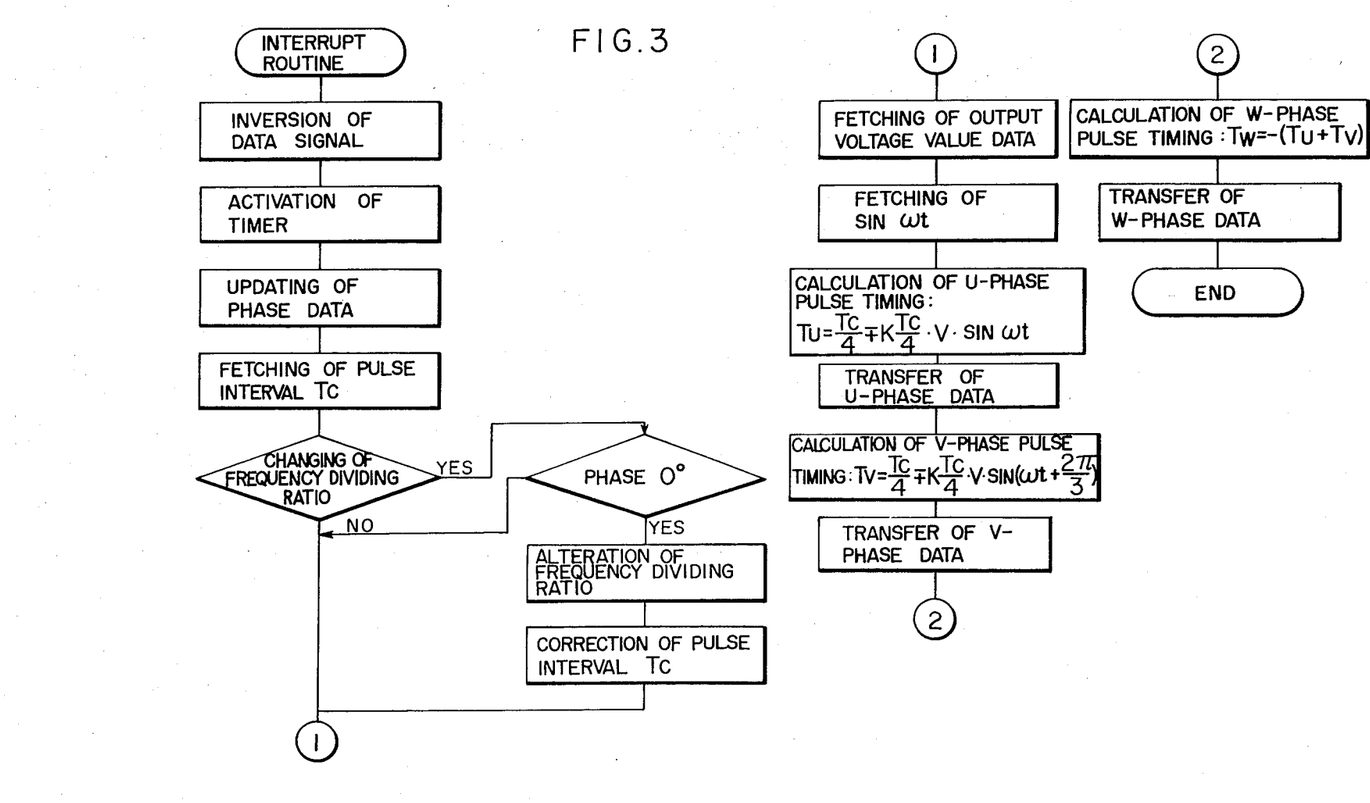
FIG. 3 is a flow chart for illustrating operation of the same system.

With the arrangement of the control circuit described above, operation thereof will be elucidated by referring to a timing chart shown in FIG. 2 and a flow chart shown in FIG. 3. When the phase output pulse train of the inverter is to be represented by pulse signals of positive potential or level and zero potential or level, the phase output pulse train will be in such a form of pulse signal train as illustrated at (b) in FIG. 2, in which duration of the positive potential or the zero potential varies progressively. In this conjunction, the relationship between the fundamental wave and the carrier employed heretofore in the inverter control will be considered. When the waveform of the fundamental wave is represented by S with that of the carrier being represented by M as shown in FIG. 2 at (a), the phase output pulse train is derived in the form of the pulse train shown at (b) from the relationship between fundamental waveform S and the carrier waveform M. More specifically, the durations of the low and high potential levels Lo and Hi of the phase output pulse train (b) are substantially equal to each other in the vicinity of the zero-crossing of the fundamental waveform S. On the other hand, in the positive range of the fundamental wave S, the duration of the low or zero potential Lo of the phase output pulse train (b) becomes shorter as the absolute value of the fundamental wave S increases. On the other hand, within the negative range of the fundamental wave S, the duration of the or zero level Lo of the phase output pulse train (b) becomes longer as the absolute amplitude of the fundamental wave S increases. Further, when the carrier M is additionally considered, it will be seen that, within a period Tc of the carrier M between the successive positive and negative peaks thereof, a time interval $T_{P1}$ between the positive peak of the carrier M and the succeeding time point at which the phase output pulse signal (B) rises to the positive or high level Hi becomes shorter as the absolute value of the fundamental wave S is increased in the positive range. On the contrary, a time interval $T_{P2}$ between the negative peak of the carrier M and a succeeding time point at which the phase output pulse signal (B) changes to the zero level Lo becomes shorter as the absolute value of the fundamental wave S is increased in the negative range thereof. In other words, the intervals $T_{P1}$ and $T_{P2}$ under consideration can be expressed in terms of a quarter-period of the carrier M as follows:

$$T_{P1} = \frac{Tc}{4} - K \frac{Tc}{4} \cdot V \cdot \sin \omega t \qquad (2)$$

$$T_{P2} = \frac{Tc}{4} + K \frac{Tc}{4} \cdot V \cdot \sin \omega t \qquad (3)$$

In light of the result of the above analysis, the phase output pulse train or signal (b) is derived by correspondingly controlling the intervals $T_{P1}$ and $T_{P2}$ in the case of the illustrated embodiment.

The control will be further described by referring to the flow chart shown in FIG. 3 in combination with the block diagram shown in FIG. 1. When the oscillator 13 starts oscillation in response to the speed command value, the frequency divider circuit 14 receives the pulse train outputted from the oscillator 13 to count the pulses and produces an interrupt pulse p (FIG. 2) every time the number of the counted pulse has attained the value corresponding to the frequency division ratio which is previously so determined in consideration of the inverter output frequency that twice as many as the pulses of the phase output pulse train (b) are available for constituting one cycle of the inverter output signal. Data of the frequency division ratios for the desired inverter output frequencies are previously stored in the memory 18. In this way, the interrupt pulse p is produced periodically at every positive and negative peak of the carrier M made use of in the prior art inverter control. The data of frequency division ratio stored in the memory 18 is supplied to the frequency division circuit 14 by way of the arithmetic unit 17. In the case of the illustrated embodiment, the pulse interval measuring circuit 15 is adapted to measure the pulse interval at every other pulse as the pulse interval between the successive particular or predetermined pulses mentioned hereinbefore.

In response to every interrupt signal p produced from the frequency division circuit 14, the arithmetic unit 17 executes an interrupt routine illustrated in FIG. 3 in accordance with the corresponding program stored in the memory 18. More specifically, upon activation of the interrupt routine, the arithmetic unit 17 firstly inverts data signal shown in FIG. 2 at (c), which data signal is supplied from the waveform processing circuit 20. Subsequently, the arithmetic unit 17 produces a command signal for activating the timer circuit (or pulse width conversion circuit) 19 which operates on the basis of timing data for generating the phase output pulse train, the data having been arithmetically determined in the execution of the preceding interrupt routine. Next, the arithmetic unit 17 updates the current or instant phase data for the fundamental wave S located in the work area of the memory 18. This is because the phase interval to be updated at every interrupt pulse is determined as the number of the interrupt pulses for the fundamental wave S is determined on the basis of the phase output pulse number (or frequency of the carrier M employed heretofore) for every range of the predetermined speed command values (inverter output frequencies). More specifically, since a number of the interrupt pulses which are twice as many as the pulses constituting an output phase pulse train outputted during a single period of the fundamental wave S are generated at an equi-interval during the single period of the fundamental wave S, the current phase data for the fundamental wave S is updated in response to every interrupt pulse by a value corresponding to a quotient resulting from division of $2\pi$ by the number of interrupt pulses generated during the single period of the fundamental wave S. Next, the arithmetic unit 17 fetches the pulse interval data Tc from the pulse interval measuring circuit 15 and stores the data in the working area of the memory 18 for the succeeding arithmetic processing. Subsequently, the arithmetic unit 17 fetches the speed command input through the A/D converter 16 for comparison with the data representing the relation between the inverter output frequency and the frequency division ratio stored in the memory 18 in the form of a data table. When it is determined on the basis of the result of comparison that no necessity exists for changing the frequency dividing ratio, i.e. the number of the phase output pulses for one cycle of the fundamental wave, the routine proceeds to the next step where the output voltage value of the output voltage command circuit 12 is fetched by the arithmetic unit 17 through the A/D converter 16 to be stored in the working area of the memory 18 for the subsequent arithmetic processing. Subsequently, the arithmetic unit 17 makes reference to a sine table stored previously in the memory 18 and containing data concerning the relations between the phases of the phase output pulses and the instantaneous values at the operating phase position of the fundamental wave S, to read the data of the required instantaneous value (sin $\omega t$) on the basis of the updated operating phase data. The result of the reading operation is temporarily stored in a working area of the memory 18. Next, the arithmetic unit 17 arithmetically determines the timing for pulse generation in accordance with the expression (2) or (3) mentioned hereinbefore on the basis of the pulse interval data Tc, the output voltage value data V and the instantaneous value data sin $\omega t$ fetched at the respective preceeding steps. At first, the pulse interval Tu for the U-phase is calculated. More specifically, when the data signal c inverted and held at the start of the interrupt routine is at the low or zero level Lo, the timing $Tu_1$ at which the phase output pulse b rises up is determined in accordance with the expression (2). Namely, $$Tu_1 = \frac{Tc}{4} - K\frac{Tc}{4} \cdot V \cdot \sin \omega t \quad (4)$$

On the other hand, when the data signal c is at the high or positive level Hi, the timing $Tu_2$ at which the phase output pulse b falls is arithmetically determined in accordance with the expression (3). Namely, $$Tu_2 = \frac{Tc}{4} + K\frac{Tc}{4} \cdot V \cdot \sin \omega t \quad (5)$$

The expressions (4) and (5) are alternately selected in every execution of the interrupt routine, wherein the result of the arithmetic operation is transferred to a temporary storage area for the U-phase data saved in the timer circuit 19 at the succeeding step. After the transfer of the U-phase pulse timing data Tu has been completed, the arithmetic unit 17 reads from the sine table the instantaneous value of the fundamental wave S which differs by $(\frac{2}{3})\pi$ in phase from the updated operating phase data, to thereby calculate the V-phase pulse timing Tv on the basis of the data read out from the sine table in accordance with $$T_v = \frac{Tc}{4} \mp K\frac{Tc}{4} \cdot V \cdot \sin\left(\omega t + \frac{2}{3}\pi\right) \quad (6)$$

The calculated data of the timing $T_v$ at which the V-phase output pulse rises up or falls is also transferred to a temporary storage area for the V-phase data reserved in the timer circuit 19 at the succeeding step. Finally, the timing at which the W-phase output pulse rises up or falls is determined on the basis of the timing data Tu and Tv for the U- and V-phases, respectively, in accordance with $$Tw = -(Tu + Tv) \quad (7)$$

The calculated W-phase timing data Tw is also transferred to the temporary storage area for the W-phase data reserved in the timer circuit (or pulse width conversion circuit) 19. Of course, the results of the timing calculation for the U-phase and V-phase pulses are stored also in the working area of the memory 18 for performing the calculation in accordance with the expression (7). In this manner, the arithmetic unit 17 executes the interrupt routine in response to each interrupt signal p supplied from the frequency division circuit 14, to thereby activate the timer circuit 19 on the basis of the calculated timing data Tu, Tv and Tw, while calculating the timing data for the following activation of the timer circuit 19.

Next, changing of the frequency dividing ratio as effected in the course of executing the interrupt routine will be described. The arithmetic unit 17 fetches as the input thereto the speed command value and makes reference to the table which is stored in the memory 18 4nd contains the data of the inverter output frequencies and the frequency dividing ratios. When it is determined that the speed command value necessitating the changing of the frequency dividing ratio has been attained, the processing mentioned below is performed starting from the time point at which the phase of the fundamental wave S is 0°, i.e. the updated operating phase is 0°. As first, a new frequency dividing ratio is read out from the table containing the data of the inverter output frequencies and the frequency dividing ratios, and the data read out is transferred to the frequency divider circuit 14. Since the periodical time interval at which the interrupt pulse p is produced must naturally be altered, the periodical time interval at which every other interrupt pulse p is to be produced in correspondence to the new speed command is calculated on the basis of the data stored previously in the data table placed in the memory or the period of the fundamental wave S corresponding to the new speed command, the oscillation period of the oscillator 13, the frequency dividing ratio of the frequency divider circuit 14 and/or the like data, the result of the calculation being utilized for correcting the pulse interval data Tc stored in the working area of the memory 18. In succession to the changing of the frequency dividing ratio and the correction of the frequency dividing ratio and the correction of the pulse interval data, the interrupt routine described hereinbefore is regained to be executed.

Upon preparation of the timing data ($Tu_1$, $Tu_2$, ..., $Tv_3$, ..., $Tw_3$) concerning the rising and falling of the phase output pulses, the timer or pulse width conversion circuit 19 operates as the timer in response to the command signal outputted from the arithmetic processing unit 17 at every interrupt pulse input p. More specifically, so long as the circuit 19 performs the operation conforming to the pulse timing data in response to the command signal, the output of the timer circuit 19 is maintained at the level Lo which is restored to the level Hi upon completion of the timer operation. The signal waveform outputted from the timer circuit 19 at that time is illustrated in FIG. 2 at (d). Subsequently, the waveform processing circuit 20 receives the output signal d of the timer circuit as the clock signal input and performs the processing of the data signal c outputted from the arithmetic unit 17 on the basis of the clock signal d. More specifically, the waveform processing circuit 20 produces as the upper arm signal the signal representative of the level of the data signal c at the time point when the clock pulse d rises up and produces as the lower arm signal the signal c. Although the timer circuit 19 and the waveform processing circuit have been described in conjunction with only one phase, it goes without saying that the same signal processing is performed for three phases simlutaneously. By operating the inverter by using the PWM signal prepared in the manner described above, the line current supplied to the three-phase induction motor is substantially of sinusoidal waveform.

According to the teaching of the invention, the PWM signal which has heretofore been obtained through synthesization of the fundamental wave and the carrier can be produced merely by repeating the relatively simple arithmetic operation. Further, since it is sufficient to store in the sine table only the instantaneous value data of the phase position at which the interrupt pulse is expected out is transferred to the frequency divider circuit 14. Since the periodical time interval at which the interrupt pulse p is is sufficient to store previously the data in an amount which is less than the product of twice the number of the phase output pulses which constitute one cycle of the fundamental wave and the number of the varieties of the phase output pulses. Further, the amount of the data stored in the sine table can be reduced by a half by storing the data in an amount corresponding to a half period of the fundamental wave and exchanging the reading phase by the reading amount.

In the case of the embodiment described above, the system is constituted by hard logics in one part and by the arithmetic unit in the other part. However, when the arithmetic unit capable of processing at an adequately high speed is used, the PWM signal can be obtained only through the arithmetic processing. In this connection, it should be noted that the time interval Tc at which the phase output pulses are produced is determined by the inverter output frequency FouT which in turn is determined by the speed command and the number $P_N$ of the pulses constituting one cycle of the fundamental wave in accordance with $$Tc = \frac{1}{P_N \cdot FouT} \qquad (8)$$

Further the commanded inverter output voltage V can be expressed as follows:

$$V = af + b \qquad (9)$$

where a and b are constants, respectively, and f represents the commanded speed. From the expressions (8) and (9), the expression (1) can be rewritten as follows:

$$T_P = K \cdot \frac{1}{P_N \cdot FouT} \cdot (af + b) \sin \omega t \qquad (10)$$
$$= \frac{K (af + b) \sin \omega t}{P_N \cdot Fout}$$

Accordingly, the PWM signal can be produced through the arithmetic operation bases on the expression (10) provided that it can be executed at a high speed.

Ideally, the pulse width of the phase output pulses is expressed by an integral of the pulses over the period of occurrence. Namely, $$T_P = \int_T^{T+Tc} V \cdot \sin \omega t \, d(\omega t) \qquad (11)$$

Accordingly, if the arithmetic operation in accordance with the above expression is possible, the pulse width modulation can be realized more ideally.

In the foregoing description, it has been assumed that the fundamental wave is of a sinusoidal waveform. However, it is possible to use a trapezoidal wave, a stepped wave or other waveform with a view to improving the waveform and reducing the memory capacity.

Although the output voltage command circuit is constituted by a sort of the function generator in the case of the illutrated embodiment, it is possible to store the voltage commands in a memory in the form of table together with the output frequency commands. Further, the output voltage data produced by the function generator can be partially corrected so that the voltage data may have more ideal value. To this end, data required for the correction may be stored in the memory.

The foregoing description has been made in detail in conjunction with the so-called synchronous inverter system in which the period of the fundamental wave coincides with that of the carrier. However, the invention is not restricted to such synchronous inverter system, but can be equally applied to the so-called asynchronous type inverter system. In the latter case, however, the amount of data to be stored in the sine table will be increased because the phase position at which the interrupt signal is produced varies relative to the fundamental wave. The increasing in the data mount may be obviated by adopting appropriate data reading procedure.

In the case of the illustrated embodiment, the feedback of the output frequency, the actual motor revolution number or the oscillation frequency of the oscillator is not adopted. However, it will be readily understood that the control operation can be effected on the basis of the data corrected appropriately through the feed-back of these parameters.

Further, in the case of the illustrated embodiment, data of the frequency dividing ratio and the pulse interval are updated only when the operating phase position relative to the fundamental wave is updated in response to the interrupt signal input which is produced when the inverter output attains the commanded value (output frequency). However, such data updating may be effected at the time when the operating phase is updated to 180°. In the case of the inverter system designed to producing the three-phase AC power, the data should preferably be updated at the time when any one of three fundamental waves constituting the three phases, respectively, has attained 180° starting from 0°, i.e. when the operating phase position relative to the fundamental wave has attained the phase position give by a integral multiple of 60° starting from 0°. By effecting the data updating at such operating phase positions, the structure of data of be updated can be simplified.

Finally, it should be mentioned that the load monitoring processing for dealing with various abnormalities and protecting procecure may take place by making use of the residual time in the interrupt processing routine, although detailed description of these processings has been omitted because they constitute no parts of the invention.

As will be appreciated from the foregoing description, there has been provided according to the invention the PWM DC-AC inverter system which includes a PWM circuit which is capable of producing the phase output pulse having a pulse width corresponding to a product of a value associated with the inverter output voltage. A value associated with the inverter output pulse interval and the instantaneous value of the fundamental wave at the output phase position of the phase output pulse. The inverter system thus enjoys significantly improved controllability.

We claim:

1. A PWM inverter system comprising:
   an output voltage setting circuit for generating a pattern of output voltage value corresponding to a speed command value;
   an oscillator for generating a pulse train having a frequency proportional to said speed command value;
   a frequency division circuit for dividing the frequency of said pulse train produced by said oscillator to produce interrupt pulses;
   a pulse interval measuring circuit for measuring a pulse interval between predetermined ones of said interrupt pulses supplied from said frequency division circuit;
   an arithmetic unit responding to the input of said interrupt pulses from said frequency division circuit to produce a timing signal corresponding to the timing at which said interrupt pulse is inputted and update data associated with current operating phase relative to a fundamental wave, to thereby produce pulse width data corresponding to the product of K·Tc·V·sin ωt, where V represents the output voltage value supplied from said voltage setting circuit, $T_c$ represents the pulse intergal supplied from said pulse interval measuring circuit, ωt represents the operating phase relative to said fundamental wave, and K represents a proportional constant;

a pulse width conversion circuit supplied with said pulse width data from said arithmetic unit for producing a width pulse train conforming to said pulse width data at every timing signal supplied from said arithmetic unit; and a waveform processing circuit supplied with said width pulse train from said pulse width conversion circuit and said timing signal from said arithmetic unit to produce sequentially phase output pulse trains.

2. A PWM inverter system according to claim 1, wherein said pulse interval measuring circuit measures the pulse interval at every other one of said interrupt pulses, and said arithmetic unit performs arithmetic operations at every input of the interrupt pulse alternately in accordance with $$\frac{Tc}{4} - K\frac{Tc}{4} \cdot V \cdot \sin \omega t, \text{ and}$$

$$\frac{Tc}{4} + K\frac{Tc}{4} \cdot V \cdot \sin \omega t.$$

3. A PWM inverter system according to claim 2, wherein said arithmetic unit responds to every input of the interrupt pulse for outputting a command signal and a timing signal constituted by a value inverting data signal, said pulse width conversion circuit responds to the command signal from said arithmetic unit for outputting the width pulse train conforming to the pulse width data supplied from said arithmetic unit, and said waveform processing circuit is supplied with the width pulse train from said pulse width conversion circuit and the data signal from said arithmetic unit for producing sequentially the phase output pulse trains.

4. A PWM inverter system according to claim 3, wherein said pulse width conversion circuit responds to the command signal supplied from said arithmetic unit for inverting the output signal during a period corresponding to the pulse width data supplied from said arithmetic unit.

5. A PWM inverter system according to claim 4, wherein said pulse width conversion circuit responds to the command signal supplied from said arithmetic unit for maintaining the output signal at a state Lo during a period corresponding to the pulse width data supplied from said arithmetic unit.

6. A PWM inverter system according to claim 5, wherein said waveform processing circuit produces sequentially the phase output pulse trains maintaining the state of the data signal supplied from said arithmetic unit, when the width pulse train signal supplied from said pulse width conversion circuit rises up.

7. A PWM inverter system according to claim 4, wherein said waveform processing circuit produces sequentially inverted phase output pulse upon every completion of the inputting of the width pulse of said width pulse train outputted from said pulse width conversion circuit during a period corresponding to the pulse width data.

8. A PWM inverter system according to claim 1. wherein said arithmetic unit responds to every input of the interrupt pulse for outputting a command signal and a timing signal constituted by a value inverting data signal, said pulse width conversion circuit responds to the command signal from said arithmetic unit for outputting the width pulse train conforming to the pulse width data supplied from said arithmetic unit, and said waveform processing circuit is supplied with the width pulse train from said pulse width conversion circuit and the data signal from said arithmetic unit for producing sequentially the phase output pulse trains.

9. A PWM inverter system according to claim 8, wherein said pulse width conversion circuit responds to the command signal supplied from said arithmetic unit for inverting the output signal during a period corresponding to the pulse width data supplied from said arithmetic unit.

10. A PWM inverter system according to claim 9, wherein said pulse width conversion circuit responds to the command signal supplied from said arithmetic unit for maintaining the output signal at a state Lo during a period corresponding to the pulse width data supplied from said arithmetic unit.

11. A PWM inverter system for converting DC power to AC power, comprising:

an output voltage setting circuit for generating a pattern of output voltage value corresponding to a speed command value;

an oscillator for generating a pulse train having a frequency proportional to said speed command value;

a frequency division circuit for dividing the frequency of said pulse train produced by said oscillator to produce interrupt pulses;

a pulse interval measuring circuit for measuring a pulse interval between predetermined ones of said interrupt pulses supplied from said frequency division circuit;

an arithmetic unit responding to the input of said interrupt pulses from said frequency division circuit to produce a timing signal corresponding to the timing at which said interrupt pulse is inputted update data associated with current operating phase relative to a fundamental wave as well as data associated with the frequency dividing ratio corresponding to said speed command value and the pulse interval, and to process and produce pulse width data alternately corresponding to the product of $$\frac{Tc}{4} - K\frac{Tc}{4} \cdot V \cdot \sin \omega t,$$

and the product of $$\frac{Tc}{4} + K\frac{Tc}{4} \cdot V \cdot \sin \omega t,$$

where V represents the pulse width interval supplied from said pulse interval measuring circuit, ωt represents the operating phase relative to said fundamental wave, and K represents a proportional constant;

a pulse width conversion circuit supplied with said pulse width data from said arithmetic unit for producing a width pulse train conforming to said pulse width data at every timing signal supplied from said arithmetic unit; and a waveform processing circuit supplied with said width pulse train from said pulse width conversion circuit and said timing signal from said arithmetic unit to produce sequentially phase output pulse trains.

12. A PWM inverter system according to claim 11, wherein said pulse interval measuring circuit measures the pulse interval at every other one of said interrupt pulses.

13. A PWM inverter system according to claim 12, wherein said arithmetic unit produces as a timing signal a command signal and a data signal for inverting the instantaneous value every time the interrupt pulse is inputted, and updates the data concerning the frequency dividing ratio and the pulse interval when one of the plural preset speed command values has been attained and when the operating phase relative to the fundamental wave has reached 0°;

said pulse width conversion circuit responds to the command signal from said arithmetic unit for outputting a width pulse signal constituted by the width pulse train conforming to the pulse width data supplied from said arithmetic unit; and said waveform processing circuit is supplied with the width pulse signal constituted by the width pulse train produced from said pulse width conversion circuit and the data signal from said arithmetic unit for producing sequentially the phase output pulse trains.

14. A PWM inverter system according to claim 13, wherein said pulse width conversion circuit responds to the command signal supplied from said arithmetic unit for maintaining the width pulse signal at the state Lo during a period corresponding to the pulse width data supplied from said arithmetic unit, and said waveform processing circuit produces sequentially phase output pulse trains maintaining the state of the data signal supplied from said arithmetic unit upon rising of the width pulse signal constituted by the width pulse train supplied from said pulse width conversion circuit.

15. A PWM inverter system according to claim 14, for obtaining a three-phase power, said arithmetic unit performs arithmetic processing upon every input of said interrupt pulse alternately in accordance with $$Tu = \frac{Tc}{4} - K \frac{Tc}{4} \cdot V \cdot \sin \omega t, \text{ and}$$

$$Tu = \frac{Tc}{4} + K \frac{Tc}{4} \cdot V \cdot \sin \omega t$$

for a first phase, $$Tv = \frac{Tc}{4} - K \frac{Tc}{4} \cdot V \cdot \sin\left(\omega t + \frac{2\pi}{3}\right), \text{ and}$$

$$Tv = \frac{Tc}{4} + K \frac{Tc}{4} \cdot V \cdot \sin\left(\omega t + \frac{2\pi}{3}\right)$$

for a second phase, and

Tw = −(Tu+Tv) for a third phase, where

Tu, Tv and Tw represent respectively the result of the arithmetic processing for the first, second and third phase of the three-phase power.

16. A PWM inverter system according to claim 11, wherein said arithmetic unit updates the data concerning the frequency dividing ratio and the pulse interval when a predetermined speed command value has been attained.

17. A PWM inverter system according to claim 16, wherein a plurality of the speed command values for updating the data of the frequency dividing ratio and the pulse interval are previously prepared.

18. A PWM inverter system according to claim 17, wherein said arithmetic unit updates the data concerning the frequency dividing ratio and the pulse interval when a given one of said plural preset speed command values has been attained and when the operating phase relative to the fundamental wave has attained a phase position determined by an integral multiple of 60° starting from 0°.

19. A PWM inverter system according to claim 11, wherein said arithmetic unit updates the data concerning the frequency division ratio and the pulse interval when a predetermined speed command value has been attained and when the operating phase relative to the fundamental wave has reached 0°.

* * * * *